United States Patent [19]

Francis, Jr.

[11] 4,386,395
[45] May 31, 1983

[54] POWER SUPPLY FOR ELECTROSTATIC APPARATUS
[75] Inventor: Ralph M. Francis, Jr., Racine, Wis.
[73] Assignee: Webster Electric Company, Inc., Racine, Wis.
[21] Appl. No.: 218,253
[22] Filed: Dec. 19, 1980
[51] Int. Cl.³ .................................. H02M 3/315
[52] U.S. Cl. ............................ 363/27; 363/135; 323/267; 315/206; 315/223
[58] Field of Search .................... 307/106–108; 328/67; 315/206, 208, 209 CD, 223; 363/16, 27, 131, 135, 71; 323/267

[56] References Cited

U.S. PATENT DOCUMENTS

| | | |
|---|---|---|
| 2,752,533 | 6/1956 | Maas . |
| 2,782,867 | 2/1957 | Hall . |
| 3,263,151 | 7/1966 | Boeker .................. 363/135 |
| 3,507,096 | 4/1970 | Hall et al. . |
| 3,524,071 | 8/1970 | Kintzinger et al. ............ 307/108 |
| 3,573,597 | 4/1971 | Genuit et al. . |
| 3,577,708 | 5/1971 | Drenning et al. . |
| 3,581,462 | 6/1971 | Stump . |
| 3,621,362 | 11/1971 | Schwarz .................. 363/27 |
| 3,622,839 | 11/1971 | Abrams et al. . |
| 3,643,405 | 2/1972 | Vukasovic et al. . |
| 3,648,437 | 3/1972 | Bridges . |
| 3,693,044 | 9/1972 | Gilman et al. . |
| 3,722,853 | 11/1973 | Burge et al. . |
| 3,723,887 | 3/1973 | Panico ..................... 315/208 X |
| 3,778,690 | 12/1973 | Rothacker et al. . |
| 3,849,670 | 11/1974 | Lourigan . |
| 3,877,896 | 4/1975 | Muskovac . |
| 3,900,789 | 8/1975 | Koubek . |
| 3,915,672 | 10/1975 | Penny . |
| 3,944,876 | 3/1976 | Helmuth . |
| 3,981,695 | 9/1976 | Fuchs . |
| 3,984,215 | 10/1976 | Zucker . |
| 4,052,177 | 10/1977 | Kide . |
| 4,055,791 | 10/1977 | Bland et al. . |
| 4,107,757 | 8/1978 | Masuda et al. . |
| 4,138,233 | 2/1979 | Masuda . |
| 4,143,303 | 3/1979 | Goble et al. . |
| 4,183,736 | 1/1980 | Milde . |
| 4,186,421 | 1/1980 | Twitchett . |
| 4,228,480 | 10/1980 | Benwood et al. . |
| 4,232,355 | 11/1980 | Finger et al. . |
| 4,238,203 | 12/1980 | Jaworowski et al. . |
| 4,238,810 | 12/1980 | Stevenson et al. . |
| 4,256,982 | 3/1981 | Bailey ..................... 328/67 X |
| 4,281,378 | 7/1981 | Ogino et al. .............. 363/135 X |

FOREIGN PATENT DOCUMENTS 2315192  1/1977  France .

OTHER PUBLICATIONS

Fitz, P. J., "Inverter Circuits and Control Techniques," Electronic Engineering, vol. 50, No. 603, Mar. 1978, pp. 59–64.

Primary Examiner—William M. Shoop
Attorney, Agent, or Firm—Mason, Kolehmainen, Rathburn & Wyss

[57] ABSTRACT

A power supply for electrostatic apparatus provides a high voltage output. The high voltage output is provided by the half wave rectification and filtering of a pulse signal from a secondary winding of a high voltage pulse transformer. The primary winding side of the high voltage pulse transformer is connected in a series loop circuit with a capacitor and a switching device. The capacitor is charged through an input choke connected to a DC supply source. The switching device is triggered after the capacitor is charged such that the capacitor is discharged through the primary winding of the high voltage transformer. The inductive collapse of the high voltage output transformer provides for the turn-off of the switching device and also serves to partially recharge the capacitor. The half wave rectified high voltage output of the power supply is obtained from the recovery pulse of the high voltage pulse transformer. The efficiency of the power supply is improved since ringing in the transformer is dampened due to the extraction of energy from the recovery pulse. The recovery pulse is much higher in amplitude than the firing pulse during which the switching device discharges the capacitor through the primary winding of the pulse transformer. During each repetitive period, the capacitor is charged, the switching device discharges the capacitor, and a short durational recovery pulse is generated. Several independent outputs of the power supply are obtained by providing respective, independent series combinations of transformers and capacitors with the series combinations being connected in parallel across the switching device.

14 Claims, 4 Drawing Figures

1

POWER SUPPLY FOR ELECTROSTATIC APPARATUS

BACKGROUND OF THE INVENTION

A. Field of the Invention

The present invention relates generally to the field of power supplies for electrostatic apparatus and more particularly to a power supply that operates on a repetitive pulse basis.

B. Description of the Prior Art

Apparatus utilizing electrostatically charged components conventionally utilize a standard core and coil type high voltage transformer, and a solid state voltage doubler and filter. The transformer is large, heavy and rather expensive and the voltage doubler circuit with required components is also large and relatively costly. Further, the operation of this type of power supply circuit is usually of relatively low efficiency and of poor power factor correction.

Although the electrostatic power supplies of the prior art are generally suitable for their intended use, it is always desirable to provide more cost effective and energy efficient power supplies.

SUMMARY OF THE INVENTION

Accordingly it is a principal object of the present invention to provide a power supply for electrostatic apparatus which is more efficient and more cost effective than power supplies of the prior art.

It is another object of the present invention to provide a power supply for electrostatic apparatus that operates on a pulse repetitive basis having a relatively short durational pulse output relative to the period of the repetitive pulse, the repetitive pulse frequency being substantially higher than the operating frequency of conventional supplies.

It is yet another object of the present invention to provide a power supply for electrostatic apparatus wherein a capacitor is discharged through the primary winding of a high voltage pulse transformer wherein the inductive collapse of the output transformer results in a recovery pulse that is half wave rectified and filtered to provide the output of the power supply at a secondary winding of the high voltage transformer.

Briefly these and other objects of the present invention are achieved by providing a power supply for electrostatic apparatus that generates a high voltage output. The high voltage output is provided by the half wave rectification and filtering of a pulse signal from a secondary winding of a high voltage pulse transformer. The filtering for most electrostatic applications is primarily accomplished by the capacitance of the electrostatic apparatus. The primary winding side of the high voltage pulse transformer is connected in a series loop circuit with a capacitor and a switching device. The capacitor is charged through an input choke connected to a DC supply source. The DC supply source is commonly achieved by full wave rectification and filtering from a 120 or 240 volt AC power source. The switching device is triggered after the capacitor is charged such that the capacitor is discharged during a firing pulse through the primary winding of the high voltage transformer. The inductive collapse of the high voltage output transformer provides for the turnoff of the switching device and also serves to partially recharge the capacitor. The half wave rectified high voltage output of the power supply is obtained from the recovery pulse of the high voltage pulse transformer. The efficiency of the power supply is improved since ringing in the transformer is dampened due to the extraction of energy from the recovery pulse. The secondary recovery pulse is much higher in amplitude than the firing pulse. The power supply in one arrangement operates to generate repetitive pulses at a frequency of 1–3 KHz. During each repetitive period, the capacitor is charged, the switching device discharges the capacitor, and a short durational recovery pulse is generated, and the capacitor is partially recharged. Several independent outputs with independent output energy of the power supply are obtained by providing respective, independent series combinations of transformers and capacitors with the series combinations being connected in parallel across the switching device. Various outputs may be individually switched without affecting the output of the other independent outputs. The electrostatic apparatus operable by the power supply includes electrostatic air cleaners or filters and electrostatic charging apparatus in office copying equipment.

In many electrostatic applications, the transformer does not require a magnetic core.

The invention both as to its organization and method of operation together with further objects and advantages thereof will best be understood with reference to the following specification taken in conjunction with the accompanying drawings.

DETAILED DESCRIPTION OF THE PREFERRED EMBODIMENT

Figure 1:
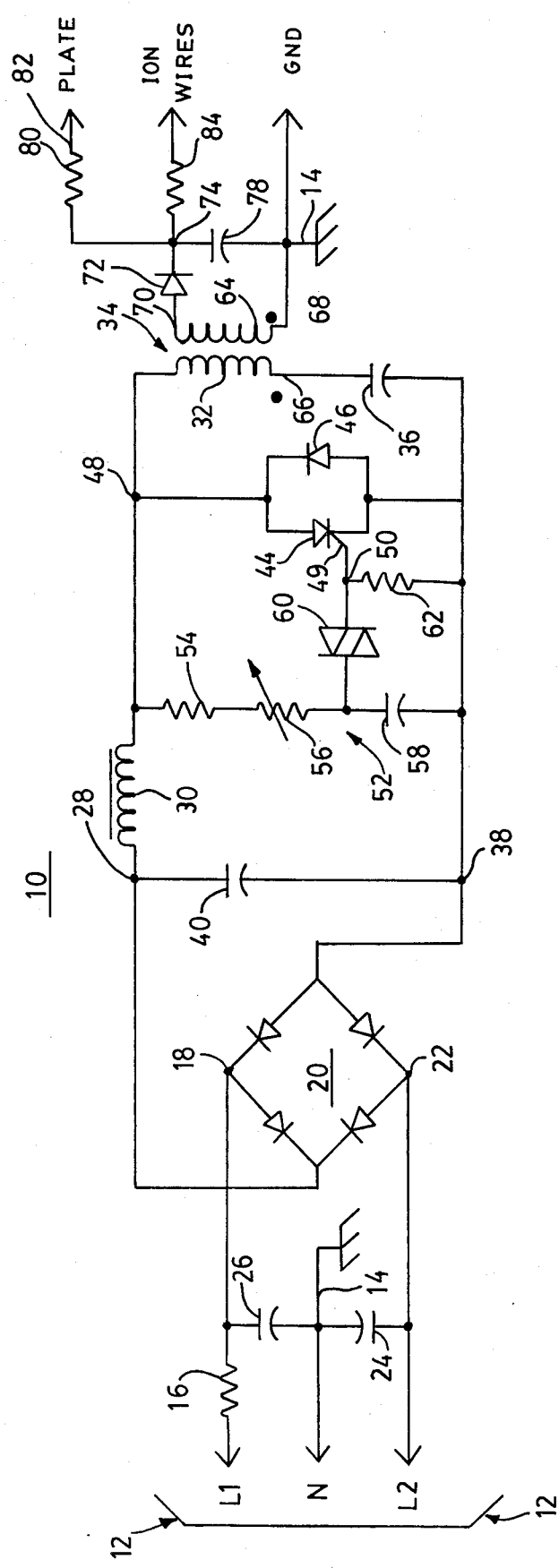
FIG. 1 is an electrical schematic representation of the power supply of the present invention for use in operating electrostatic apparatus.

Referring now to FIG. 1, the power supply 10 of the present invention is connected to an AC input source generally referred to at 12. The AC power source connection includes supply lines L1 and L2 and a neutral line N connected to ground potential at 14. The L1 supply line is connected through a series resistor 16 to one input 18 of a full wave rectification bridge 20. The L2 supply line is connected to a second input 22 of the full wave rectification bridge 20. The L2 supply line is also connected to the ground potential 14 through a filter capacitor 24. The bridge input 18 is connected to the reference potential 14 through a filter capacitor 26.

The positive DC output terminal 28 of the bridge 20 is connected through the series combination of an input choke 30, a primary winding 32 of a high voltage pulse transformer 34, and a capacitor 36 to the low DC reference output 38 of the bridge 20. A filter capacitor 40 is connected across the bridge outputs 28 and 38.

An SCR 44 is connected across the series combination of the primary winding 32 and the capacitor 36. A diode 46 is connected in parallel across and oppositely poled to the SCR 44. Thus the anode of the SCR 44 and the cathode of the diode 46 are connected to the junction 48 of the input choke 30 and the primary winding 32. Further the cathode of the SCR 44 and the anode of the diode 46 are connected to the low reference output 38. The gate lead 49 of the SCR 44 is connected to an output 50 of a triggering network generally referred to at 52.

The triggering network 52 includes the series combination of a fixed resistor 54, a variable resistor 56 and a capacitor 58 connected between the circuit nodes 48 and 38. The triggering circuit includes a triggering device 60, a DIAC in one specific embodiment, that is connected between the output 50 of the triggering circuit and the junction of the resistor 56 and the capacitor 58. Further a resistor 62 is connected between the output 50 of the triggering arrangement and the reference point 38.

The high voltage pulse transformer 34 includes a secondary winding 64 that can be air coupled to the primary winding 32; the transformer 34 not requiring a ferromagnetic core in many low power applications. The polarity dots of FIG. 1 indicate the coil ends of the primary winding 32 and the secondary winding 64 that are simultaneously at common potential. Thus when a positive voltage is present at the coil end 66 of the primary winding 32, a positive voltage is also present at the lower winding end 68 of the secondary winding 64.

The upper winding end 70 of the secondary winding 64 is connected through a diode 72 poled anode to cathode to an output 74 of the power supply 10. The coil winding end 68 of the secondary winding 64 is connected to the ground reference potential 14 and forms a ground reference output 76 of the power supply 10. A filter capacitor 78 is connected across the output terminals 74 and 76.

It should be understood that in various other specific embodiments and applications, the output of the secondary winding 64 is utilized directly or through appropriate rectification to provide appropriate positive and/or negative output voltages.

Considering an application of the power supply circuit 10 for an electrostatic air cleaner or filter, the output 74 is connected through a resistor 80 to the positive plate connections 82 of the electrostatic filter apparatus (not shown). The output 74 is also connected through a resistor 84 to the ion wires connection 86. The output 76 is connected to the ground plate connections of the electrostatic air cleaner. Conventionally, electrostatic air cleaners or filters include a number of ion wires at the air flow entrance of the air cleaner that are arranged transverse to the direction of air flow through the filter. The filter includes positively charged plates alternated with ground reference plates with the plates being arranged generally parallel to the direction of the air flow and disposed downstream of the ion wires. Thus air cleaners of this general type ionize particulate matter in the air flow with the plates causing the ionized particulate matter to be deposited on the plates of the air cleaner. Electrostatic air cleaners of this type exhibit across their grid input supply terminals a large capacitance at relatively high frequencies. A typical example of an electrostatic air cleaner includes a grid current of approximately 0.4 milliamps at 5000 volts to the ion wires and a plate current of approximately 3-4 microamps.

In operation, the resistor 16 functions as a line fuse and can also function as a dropping resistor for 220 volt operation. The input choke 30 is preferably approximately 200 millihenrys with any suitable resistance value. The triggering network of resistors 54, 56 and the capacitor 58 determine the time constant for the trigger pulse for the SCR 44. In a suitable specific embodiment, circuit values of the triggering network 52 have been found suitable to result in repetitive triggering of the SCR 44 at a rate in the range of 1 KHz to 3 KHz. Resistor 62 functions to improve turnoff characteristics of the SCR 44. The relationship between the component values of the choke 30, the capacitor 36 and the primary winding 32 as well as the coupling between the primary winding 32 and the secondary winding 64 are interrelated to provide appropriate operation of the present invention. Further, the component values of the circuit 10 avoid the necessity of elaborate turnoff circuits for the SCR 44.

Figure 2:
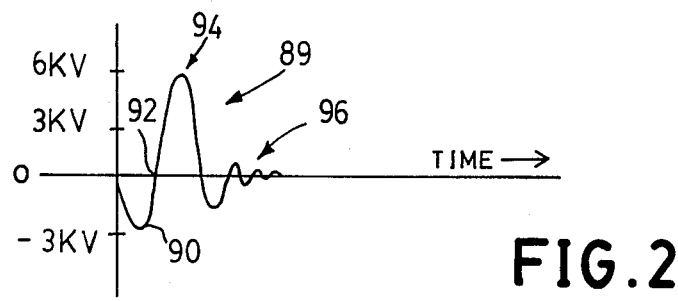
FIG. 2 is a graphical representation of a waveform occurring in a typical application of the power supply circuit of FIG. 1.

With the SCR 44 in the off nonconducting state, the capacitor 36 is charged through the primary winding 32. When the SCR 44 is triggered by the triggering circuit 52, the capacitor 36 is discharged through the primary winding 32 and through the SCR 44. Referring now to FIG. 2, the waveform 89 represents the signal versus time across the secondary winding 64 referenced to winding end 68. The curve portion 90 represents the voltage waveform across the secondary winding 64 during the time that the capacitor 36 discharges through the transformer 32 and while the SCR 44 is conductive. The inductive collapse of the transformer 34 turns off the SCR 44 at a time shortly after the curve point 92. Further, during the recovery pulse 94, energy from the transformer 34 is diverted through the fast recovery diode 46 to partially recharge the capacitor 36. The collapse recovery pulse 94 of the transformer 34 and the recharging of the capacitor 36 through the primary winding 32 and the input choke 30 improves the efficiency of the circuit 10. The diode 46 also functions to protect the SCR 44 from excess reverse voltages allowing stable and safe operation under adverse conditions such as an open or shorted secondary winding 64.

The recovery pulse 94 provides a large positive voltage pulse across the secondary winding 64 at winding end 70 with respect to winding end 68. The diode 72 half wave rectifies the output of the secondary winding 64 and charges the capacitor 78 and the grid network of the electrostatic air cleaner apparatus connected to at 82, 86. The DC output at 74 remains relatively constant between the repetitive pulses of relatively short duration due to the relatively high frequency of operation, the capacitor 78, and the capacitance of the electrostatic apparatus.

It should be understood that in various specific embodiments and applications, outputs from the secondary winding 64 can be provided including positive and/or negative voltages derived from the discharge pulse 90 and/or the recovery pulse 94.

The resistor 84 functions to current limit the output at 74 under short circuit conditions such as are encountered when a large conductive particle or mass lodges between the plates of the electrostatic air cleaner apparatus. The resistor 80 functions to current limit the output 86 and also to provide a voltage divider for the plate network connected at 82. In many forms of electrostatic air cleaner apparatus, the plate network connected across points 82 and 76 is operated at a lower potential than the ion wires at 86. In some forms of electrostatic air cleaners, the plate network may be directly connected to the ion output at the same potential.

The waveform 89 of FIG. 2 at portion 96 shows the high frequency ringing of the circuit and the transformer 34 that occurs after the recovery pulse 94. The ringing at 96 is dampened and greatly reduced with resultant improved efficiencies since the supply circuit 10 extracts energy for the output at 74 and the partial charging of the capacitor 36 from the recovery pulse curve portion 94.

The characteristics of the high voltage pulse transformer 34 are important to achieve the low cost features and high efficiency of the power supply circuit 10. Thus for many applications of low power requirements, the high voltage transformer 34 does not utilize a magnetic core but instead provides air coupling of the primary winding 32 and the secondary winding 64 and operates as a coreless pulse transformer. In the preferred embodiment, the primary and secondary windings have the same winding widths or traverse. Further additional interlayer insulation is provided to reduce interlayer capacitance to improve output voltage. Thus the transformer 34 of the power supply circuit 10 of the present invention with the noted characteristics results in operation of the circuit 10 in accordance with the waveform 89 of FIG. 2.

Considering electrostatic apparatus for use with the power supply circuit 10 in addition to electrostatic air precipitators, any apparatus that requires a high voltage electrostatic charge for operation at relatively high voltages and low currents may be suitably operated from the power supply circuit 10. For example in office copier machines, electrostatic arrangements are utilized for the charging and discharging of paper or other copying medium. The electrostatic charging arrangements of such office copiers can be appropriately supplied by the power supply circuit 10 of the present invention.

Figure 3:
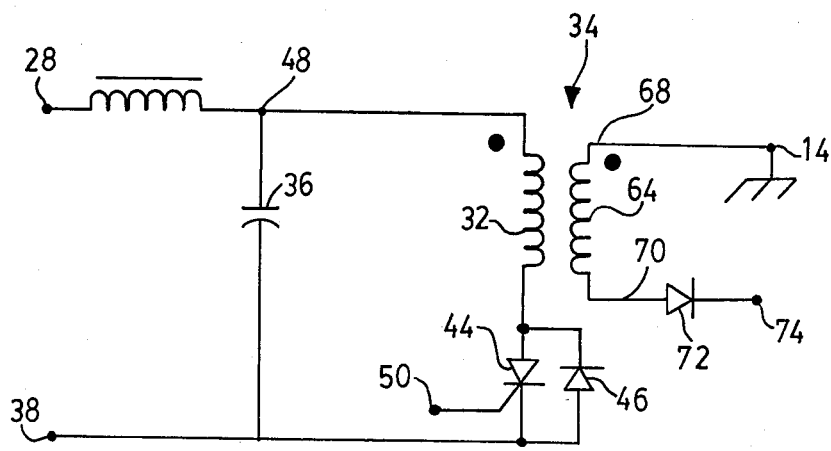
FIG. 3 is an electrical schematic representation of portions of the power supply circuit of the present invention illustrating an alternate embodiment of portions of the power supply circuit of FIG. 1.

Referring now to FIG. 3 and considering an alternate embodiment of the power supply circuit of FIG. 1, the capacitor 36, the SCR 44 and the primary winding 32 of the high voltage transformer 34 are arranged in a series circuit loop as in FIG. 1. However, in FIG. 3 the capacitor 36 is connected between the junction 48 and the low DC supply reference 38 of the bridge 20. Further the series combination of the primary winding 32 and the SCR 44 are connected between the junction point 48 and the low DC supply reference output 38. Operation of the alternate arrangement of FIG. 3 is similar to that of FIG. 1 with triggering of the SCR causing the discharge of the capacitor 36 through the primary winding 32 of the transformer 34.

Figure 4:
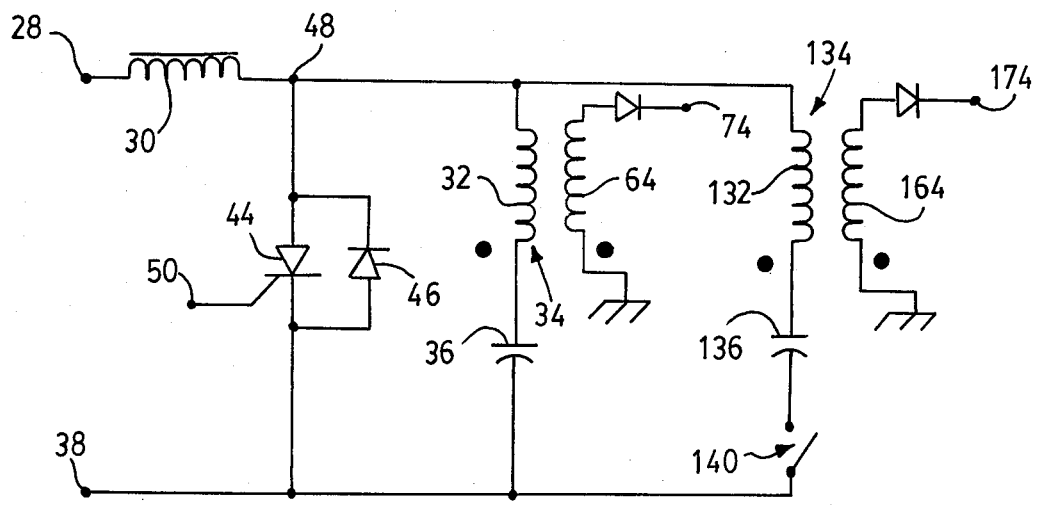
FIG. 4 is an electrical schematic representation of the power supply circuit of FIG. 1 illustrating additional independent output arrangements.

Referring now to FIG. 4, the power supply circuit 10 is capable of being arranged to provide multiple independent outputs by the provision of additional parallel circuit branches including the series combination of a capacitor and a transformer. For example, in FIG. 4, the series combination of a capacitor 136 and a primary winding 132 of a transformer 134 is connected in parallel with the SCR 44 and in parallel with the series combination of the primary winding 32 and the capacitor 36. The transformer 134 is similar in structure to the transformer 34. Thus, the additional output 174 of the power supply circuit may be obtained from the secondary winding 164 through a diode 172. Further, the outputs at 74 and 174 may be independently controlled by the provision of a switch 140 in the series circuit branch with the capacitor 136 and the primary winding 132. The operation of the switch controlling the on or off state of the output 174 does not have any appreciable effect on the output 74. It should be understood that any desired number of multiple outputs may be supplied in this manner. Further, it should also be understood that the various output branches allow independent selection of component values of the capacitors 36, 136 and transformers 34, 134 to provide desired output levels at the independent outputs.

While there has been illustrated and described several embodiments of the present invention, it will be apparent that various changes and modifications thereof will occur to those skilled in the art. For example, by variations of the resistance of component 56, the output voltage may be suitably varied as desired. Further, in order to stabilize the output voltage for variations in input supply voltages, a zener diode is added having a cathode connected to the junction of resistors 54 and 56 and an anode connected to the reference 38 to provide a stable reference voltage to the triggering arrangement 52. Although the power supply circuit of the present invention is generally intended for electrostatic applications, it should also be understood that the present invention is also applicable to general power supply applications where power requirements are small.

It is intended in the appended claims to cover all such changes and modifications as fall within the true spirit and scope of the present invention.

What is claimed as new and desired to be secured by Letters Patent of the United States is:

1. A power supply circuit for apparatus comprising:
   an input choke having one end connected to one side of a DC supply source connection;
   a transformer;
   a circuit loop connected between said second end of said input choke and a second side of said DC supply source connection, said circuit loop including the series connection of a capacitor, a switching device and a primary winding of said transformer, said switching device including a controlled conduction path and a control input for rendering said conduction path conductive, said capacitor being charged primarily by said DC supply source;
   a resistive-capacitive trigger circuit connected between said DC supply source connections and said control input for repetitively rendering said switching device conductive at a predetermined repetitive rate so as to repetitively discharge said capacitor through said primary winding;
   said transformer including a secondary winding and having a predetermined turns ratio between said secondary winding and said primary winding;
   output circuit means for rectifying and filtering the output of said secondary winding to provide the output of said power supply circuit, said output circuit means comprising a diode rectifier having an anode connected to a first end of said secondary winding, said power supply output being provided between the cathode of said diode recitifier and the second end of said secondary winding, the discharge of said capacitor through said primary winding resulting in a positive voltage being developed across said primary winding referenced to a first end of said primary winding, said primary and secondary windings being wound and disposed relative to each other such that said first end of said primary winding is of opposite polarity with respect to said first end of said secondary winding, said power supply output being obtained from a recovery pulse in said primary winding of said transformer due to the inductive collapse of said transformer and occurring after said capacitor is discharged and subsequent to the occurrence of the signal across said primary winding that is in response to the discharge of said capacitor, said recovery pulse in said primary winding being of opposite polarity to said signal occurring in response to the discharge of said capacitor; and means for enhancing said recovery pulse and said power supply output, said recovery pulse enhancing means comprising a fast recovery diode being connected across said switching device and oppositely poled with respect to said switching device and said transformer including predetermined characteristics defining the coupling between said primary and secondary windings and the relative winding widths of said primary and secondary windings.

2. The power supply circuit of claim 1 wherein said transformer comprises an air core with coupling of said primary and secondary windings being through the ambient.

3. The power supply circuit of claim 1 wherein said primary winding and said capacitor are connected in series with each other and the series combination of said capacitor and said primary winding is connected in parallel with said switching device.

4. The power supply circuit of claim 1 wherein said primary winding and said switching device are connected in series with each other and the series combination of said switching device and said primary winding is connected in parallel with said capacitor.

5. The power supply circuit of claim 1 wherein said switching device is an SCR having an anode lead connected to said second end of said input choke and a cathode lead connected to said second side of said DC supply source connection.

6. The power supply circuit of claim 1 further comprising means responsive to an AC power source for providing a DC power source across said DC supply source connection.

7. The power supply circuit of claim 1 wherein said recovery pulse is of a higher peak amplitude than said signal resulting from the discharge of said capacitor.

8. The power supply circuit of claim 6 further comprising at least one additional series combination of a second capacitor and a second primary winding of a second transformer connected in parallel with said switching device to provide at least one respective additional output of said power switching circuit.

9. The power supply circuit of claim 8 further comprising switch means aditionally connected in series with said second capacitor and said second primary winding for controlling operation of said additional output of said power supply circuit independent of said one or more other outputs of said power supply circuit.

10. The power supply circuit of claim 1 further comprising electrostatic air cleaner apparatus operably connected to said output of said power supply circuit, said electrostatic air cleaner apparatus including a plate connection, an ion wire connection and a reference connection, said output circuit means further comprising means for providing a current limited ion wire output, a plate output having a predetermined output potential equal to or less than said ion wire output and a reference output connection.

11. The power supply circuit of claim 1 wherein said switching device comprises an SCR.

12. The power supply circuit of claim 1 wherein said secondary winding is a layered winding and said predetermined characteristic of said transformer for enhancing said recovery pulse further includes predetermined interlayer insulation in said secondary winding to reduce interlayer capacitance.

13. A power supply circuit for apparatus comprising:
an input choke having one end connected to one side of a DC supply source connection;
a first transformer;
a circuit loop connected between said second end of said input choke and a second side of said DC supply source connection, said circuit loop including the series connection of a first capacitor, a switching device and a first primary winding of said first transformer, said switching device including a controlled conduction path and a control input for rendering said conduction path conductive, said first capacitor being charged primarily by said DC supply source, said first primary winding and said first capacitor being connected in series with each other and the series combination of said first capacitor and said first primary winding being connected in parallel with said switching device;
a second transformer having a second primary winding;
a second capacitor being connected in series with said second primary winding, the series combination of said second capacitor and said second primary winding being connected in parallel with said switching device;
a resistive-capacitive trigger circuit connected between said DC supply source connections and said control input for repetitively rendering said switching device conductive at a predetermined repetitive rate so as to repetitively discharge each of said first and second capacitors through said first and second primary windings respectively;
each of said transformers including a secondary winding and having a predetermined turns ratio between said secondary winding and said respective primary winding; and
output circuit means for rectifying and filtering the output of said secondary windings to provide two outputs of said power supply circuit, said output circuit means comprising two diode rectifiers, each of said diodes having an anode, the anode of a first of the diodes being connected to a first end of a first of said secondary windings, the anode of said second diode being connected to a first end of said other secondary winding, said power supply outputs being provided between the cathodes of said diode rectifiers and the respective second ends of said secondary windings,
the discharge of each of said capacitors through said respective primary winding resulting in a positive voltage being developed across said respective primary winding referenced to a first end of said respective primary winding, said respective primary and secondary windings being wound and disposed relative to each other such that said first end of said primary winding is of opposite polarity with respect to said first end of said respective secondary winding,
said power supply outputs being obtained from a respective recovery pulse in each of said primary windings of said transformers occurring after said respective capacitors are discharged and subsequent to the occurrence of the signal across said respective primary winding that is in response to the discharge of said respective capacitor, said recovery pulses in said primary windings being of opposite polarity to said signal occurring in response to the discharge of said respective capacitor.

14. The power supply circuit of claim 13 further comprising switch means additionally connected in series with said second capacitor and said second primary winding for controlling operation of said output at said cathode of said second diode independent of said output from said cathode of said one diode connected to said first secondary winding.

* * * * *